(12) United States Patent
Langhans

(10) Patent No.: US 7,332,083 B2
(45) Date of Patent: Feb. 19, 2008

(54) PROCESS AND DEVICE FOR BIOLOGICAL TREATMENT OF A SUSPENSION IN A BIOREACTOR

(75) Inventor: Gerhard Langhans, Dresden (DE)

(73) Assignee: Linde-KCA-Dresden GmbH, Dresden (DE)

( * ) Notice: Subject to any disclaimer, the term of this patent is extended or adjusted under 35 U.S.C. 154(b) by 257 days.

(21) Appl. No.: 11/272,007

(22) Filed: Nov. 14, 2005

(65) Prior Publication Data

US 2006/0118484 A1 Jun. 8, 2006

(30) Foreign Application Priority Data

Nov. 12, 2004 (DE) ...................... 10 2004 054 673

(51) Int. Cl.
C02F 3/28 (2006.01)
C02F 11/04 (2006.01)

(52) U.S. Cl. .................. 210/603; 210/631; 210/197; 210/198.1

(58) Field of Classification Search ................ 210/603, 210/631, 188, 194, 196, 197, 198.1
See application file for complete search history.

(56) References Cited

U.S. PATENT DOCUMENTS

| 4,514,297 | A | * | 4/1985 | Enqvist ...................... 210/194 |
| 4,954,257 | A | | 9/1990 | Vogelpohl et al. |
| 5,494,574 | A | * | 2/1996 | Unterman et al. .......... 210/150 |
| 5,565,098 | A | | 10/1996 | Vellinga et al. |
| 5,942,116 | A | | 8/1999 | Clark et al. |
| 7,078,439 | B2 | * | 7/2006 | Odueyungbo et al. ...... 518/700 |
| 2005/0029189 | A1 | * | 2/2005 | Langhans et al. ........... 210/629 |
| 2005/0126997 | A1 | * | 6/2005 | Langhans et al. ........... 210/629 |

OTHER PUBLICATIONS

Search Report of EP 05024303, filed Nov. 8, 2005.*

* cited by examiner

*Primary Examiner*—Fred G. Prince
(74) *Attorney, Agent, or Firm*—Millen, White, Zelano & Branigan, P.C.

(57) ABSTRACT

A process and a device for biological treatment of a suspension in a bioreactor is described, which is made especially as a loop reactor with a central guide pipe (2) and gas injection (3). In order to be able to use the bioreactor for treatment of renewable raw materials as well, it is proposed that the treated suspension be removed from a zone of the bioreactor with a small solid concentration and the removed suspension be routed out of the bioreactor by way of a tilted discharge (4). In the tilted discharge (4), separation of gas and solids is produced, and at least a portion of the solids is returned against the main suspension flow in the discharge (4) to the bioreactor. In this way, even for treatment media with a high concentration of dissolved compounds and few suspended solids, the biomass is concentrated in the bioreactor.

20 Claims, 2 Drawing Sheets

PROCESS AND DEVICE FOR BIOLOGICAL TREATMENT OF A SUSPENSION IN A BIOREACTOR

The invention relates to a process for biological treatment of a suspension in a bioreactor, at least part of the treated suspension being withdrawn from the bioreactor, and a device for executing the process.

As a result of increasingly scarce fossil energy sources, the use of renewable energy is becoming more and more important. To some extent, state promotion of these forms of energy leads to the effort to use existing technologies in the area of renewable energy. Thus, for example, when fermentation plants for biogas generation are operated, a continuous interest is engendered in the use of industrial residual and waste sludges containing organic compounds and in renewable raw materials as fermentation substrate.

Such material flows are burdened either from their origin with high concentrations of dissolved organic compounds but few suspended solids, or are so greatly reduced within the framework of anaerobic microbial metabolism in the particular organic mass that the material sludge properties that otherwise determine the process in waste fermentation are no longer relevant to the technological arrangement.

Decoupling of the hydraulic dwell time and solid dwell time no longer occurs for these substances in a conventional fully-mixed bioreactor. Thus, the dwell time and, as a result of that, the reaction volume should be arranged such that the washout time determined by the bacterial growth rate is reliably exceeded for the reactor. Retention and thus concentration of the biomass as a prerequisite for shortening the dwell time therefore require special measures.

Solutions known from anaerobic treatment of solid-free waste water for bacteria immobilization in fixed-bed or suspended-bed reactors or sludge bed reactors (UASB) can no longer be used without problems for the aforementioned applications. Both the small proportions of solids present in most cases in the form of fibers or dried grain hulls and also the organic particles that are largely decomposed during fermentation can lead to accumulation in immobilization reactors and can cause destructuring of the carrier beds. Sludge return by way of an external settling system under anaerobic conditions is very complex and therefore is not generally used.

One object of this invention is to devise a process of the initially mentioned type and a device for carrying out the process such that problem-free operation of the bioreactor is enabled even in the described material flows.

Other objects and advantages of the invention will become apparent from the following description and appended claims.

One object is achieved on the process side according to the invention in that the treated suspension is removed from a zone of the bioreactor in which there is a solid concentration that is lower than the average solid concentration in the bioreactor, and the removed suspension is routed out of the bioreactor by way of a discharge that is tilted against the horizontal such that in the withdrawn suspension, separation of gas and solids is produced and at least a portion of the solids is returned against the main suspension flow in the discharge to the bioreactor. In general, the zone of lower solid concentration is generally lower by at least 15%, preferably at least 40% lower than the average solid concentration in the bioreactor.

Therefore, in the discharge area of the bioreactor, conditions are created such that the treated suspension is removed from a zone of the bioreactor with lower solid concentration and in the discharge, flotation effects are avoided, and so as to permit the return of solid flakes that can form sediment in the reactor is enabled. In this way, the concentration of anaerobic biomass in the fully-mixed bioreactor is increased. This is especially advantageous when using fermentation reactors for treatment of renewable raw materials and industrial residual and waste sludges. In this application, specifically the supplied organic sludges and mashed renewable raw materials contain pure dissolved or suspended organic compounds with an organic proportion of dry substance of generally roughly 80 to 98% and an inorganic inert portion primarily in the form of dissolved salts. As a result of the high degree of decomposition of organic substance of generally between 60 and 90%, the remaining residual solid content, especially also in the form of suspended particles, in the bioreactor is very low.

According to one especially preferred configuration of the invention, to circulate the suspension in the central area of the bioreactor, a vertical flow, and, in the edge area of the bioreactor, a vertical flow directed opposite the flow in the central area with a lower flow velocity are produced, and the treated suspension is removed from the lower edge area of the bioreactor. To do this, for example, there can be a central guide pipe with gas injection in the bioreactor. This preferred configuration is based on the finding that in a bioreactor with a medium of low particulate solid concentration and comparatively high biogas production, a concentration gradient of the suspended solids is established vertically. As a result of, e.g., single to triple pumping of the contents of the bioreactor through the central guide pipe to the liquid surface, floating solids that are located specifically in the vicinity of the bottom are generally conveyed to the top. In contrast, vertical outflow takes place in the annulus between the guide pipe and tank wall at a much lower speed. Preferably, the flow in the edge area has a flow velocity of less than 2.5 cm/sec, especially preferably roughly 0.5 to 1.5 cm/sec. The biogas bubbles rising in the entire reactor space cause an additional buoyancy and flotation effect. Thus, fewer suspended solids, especially bacteria biomass flakes, are transported downward than are conveyed upward in the guide pipe. Accordingly, in the upper area of the suspension located in the bioreactor, a higher solid concentration than in the vicinity of the bottom is established. This effect can be controlled within limits via gas injection into the central guide pipe and the pump effect resulting therefrom. To use the described effect in this preferred configuration, the treated suspension is withdrawn from the bottom area of the bioreactor. In order to ensure further biomass retention in the outlet, flotation effects should be reduced by likewise rising biogas bubbles in the discharge, and the formation of a stable flake structure should be supported. This is achieved preferably in that the removed suspension is routed out of the bioreactor with a flow velocity of preferably from roughly 0.5 to roughly 2.5 cm/sec via the discharge that is tilted against the horizontal.

To carry out the process, a bioreactor with a vertically aligned reactor tank for biological treatment of a suspension is provided. In the interior of the reactor tank, there is a vertically aligned guide means for circulating the suspension in the bioreactor.

On the device side, this object is achieved in that there is a discharge pipe that is tilted against the vertical, which begins within the reactor tank in the vicinity of the bottom of the reactor tank, and which ends outside of the reactor tank in the upper area of the reactor tank.

Advantageously, the guide means is designed as a guide pipe, the diameter of the guide pipe and the diameter of the reactor tank being in a preferred ratio from 0.1 to 0.15. In this way, it is achieved that the vertical flow velocity in the annulus between the guide pipe and tank wall is much lower than the flow velocity in the guide pipe.

To implement the discharge pipe, the principle, known in the art, of a slant fin clarifier is adapted to the task in the anaerobic process. The discharge pipe preferably has a diameter from roughly 300 mm to roughly 1000 mm. In this way, the flow velocities in the discharge pipe are from 0.5 cm/sec to 2.5 cm/sec. Advantageously, the discharge pipe, preferably beginning in the vicinity of the bottom near the lower guide pipe inlet, is routed obliquely up with a tilt angle against the vertical from 30 to 45 degrees and through the reactor tank wall that it passes under the minimum liquid level in the reactor tank. Outside of the reactor tank, the discharge pipe is advantageously divided into two pipes by way of a Y-fitting, the sum of the cross-sectional areas of these two pipes being at most as great as the cross-sectional area of the discharge pipe. The two pipes finally discharge into a discharge chamber that is located outside on the reactor tank. Here, the pipes empty preferably from underneath into the discharge chamber, the one pipe having the capacity to be shut off and ending flush with the bottom of the discharge chamber and defining the minimum liquid fill level in the reactor tank, while the other pipe with a camber to the outlet of the first pipe projects into the discharge chamber and defines the maximum liquid level fill level in the reactor tank.

Advantageously, an outlet pipe for withdrawal of treated suspension and optionally transfer to a subsequent process stage leads out of the bottom of the discharge chamber. For example, the outlet pipe can empty while immersed in a discharge buffer tank. In contrast, an exhaust gas line is preferably attached to the cover of the discharge chamber and can be connected to a gas network or exhaust air treatment.

According to one development of the inventive idea, in the area of the discharge chamber, therefore between the minimum and maximum fill level of the bioreactor, there is a sealable passage into the reactor tank wall from the reactor tank interior to the discharge chamber. Here, the passage into the reactor tank interior is advantageously provided with a flow deflector plate that is set at an angle of roughly 5 degrees to roughly 10 degrees to the radial direction. At the height of the passage, there is preferably at least one nozzle for delivering a liquid-free jet into the reactor tank. For example, a nozzle system in the reactor gas space can be installed just above the liquid surface in order to degas the floating material that has washed radially to the outside from the guide pipe by the acting forces of momentum of the liquid-free jets and to mix it again into the liquid. This effect can be supported by metering of a foam inhibitor. Using the described nozzle system, unmanageable components of the floating layer can be removed from the bioreactor. Formation of a floating cover can take place by, for example, dried grain hulls, fibers and the like from chopped or ground vegetable raw materials that are not affected or only insignificantly affected by bacterial metabolism. To remove such floating layer components, the fill level of the bioreactor is dammed up by closing the lower discharge pipe into the discharge box as far as the top overflow. Due to the horizontal portion of the momentum of the liquid-free jets, a rotary flow is induced along the reactor tank wall. The floating material that has been set into motion in this way banks up against the now flooded flow deflector sheet. After opening the shut-off between the bioreactor and the discharge chamber, the floating material can be withdrawn from the bioreactor via the passage.

With the invention, concentration of the biomass in the reactor tank is surprisingly enabled even for a fully mixed bioreactor. Thus, a reduction of the hydraulic dwell time below the theoretical bacteria washout time is also achieved. Overall, with the invention, a problem-free operation of bioreactors when using renewable raw materials is enabled for the first time.

BRIEF DESCRIPTION OF DRAWINGS

The invention, without limitation of the appended claims, will be explained in more detail below based on a preferred embodiment shown diagrammatically in the figures.

Figure 1:
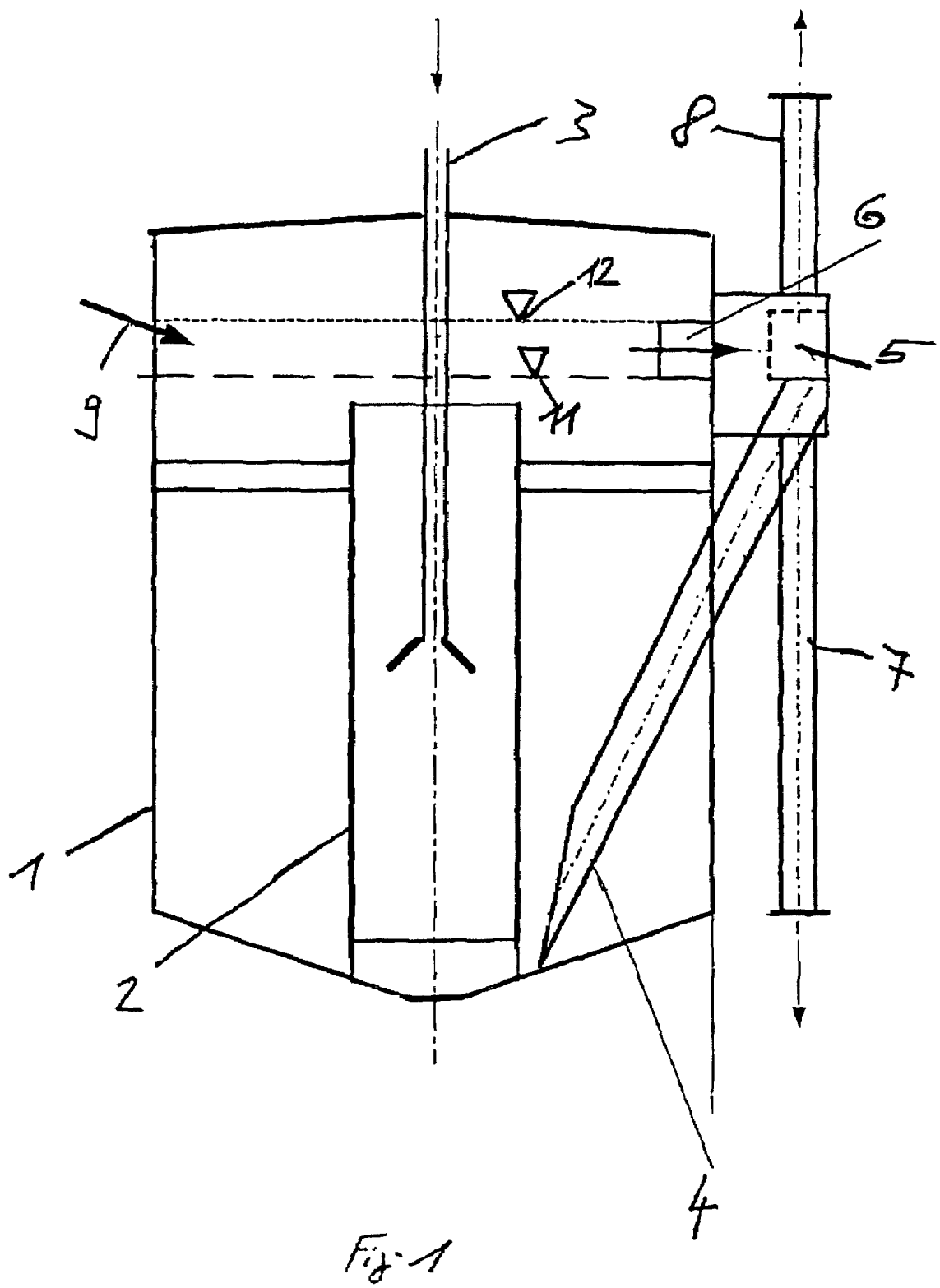
FIG. 1 shows a bioreactor with a central guide pipe and slanted discharge pipe in cross-section.

The bioreactor shown in FIG. 1 for anaerobic treatment of suspensions has a reactor tank 1 in which there is a central guide pipe 2. Via a gas supply line 3 into the central guide pipe 2, a gas, e.g., an oxygen-containing gas for suppressing hydrogen sulfide formation in the bioreactor, can be injected into the guide pipe 2. In this way, in the reactor tank 1, loop flow of the reactor contents is produced. The reactor contents can comprise, for example, renewable raw materials that in the mashed state form a flowable suspension. In the reactor tank 1, there is furthermore a discharge pipe 4 that is tilted against the horizontal and that is routed with a tilt angle from 30 to 45 degrees against the vertical obliquely up and through the tank wall. The discharge pipe 4 passes through the tank wall underneath the minimum liquid level 11 in the reactor tank 1. A Y-fitting that is not shown in FIG. 1 divides the discharge pipe 4 into two pipes that discharge from underneath into a discharge chamber 5 that is mounted outside on the reactor tank 1. An outlet pipe 7 leads from the bottom of the discharge chamber 5 to a subsequent process stage that is not shown in FIG. 1. By way of an exhaust gas line 8 mounted on the cover of the discharge chamber 5, the system is connected to a gas network or exhaust air treatment. In the area between the minimum liquid level 11 and the maximum liquid level 12 of the reactor tank 1, in the reactor tank wall there is a sealable passage to the discharge chamber 5 that in the reactor tank interior is provided with a flow deflector plate 6 that is set at an angle of roughly 5 degrees to roughly 10 degrees to the radial direction.

Figure 2:
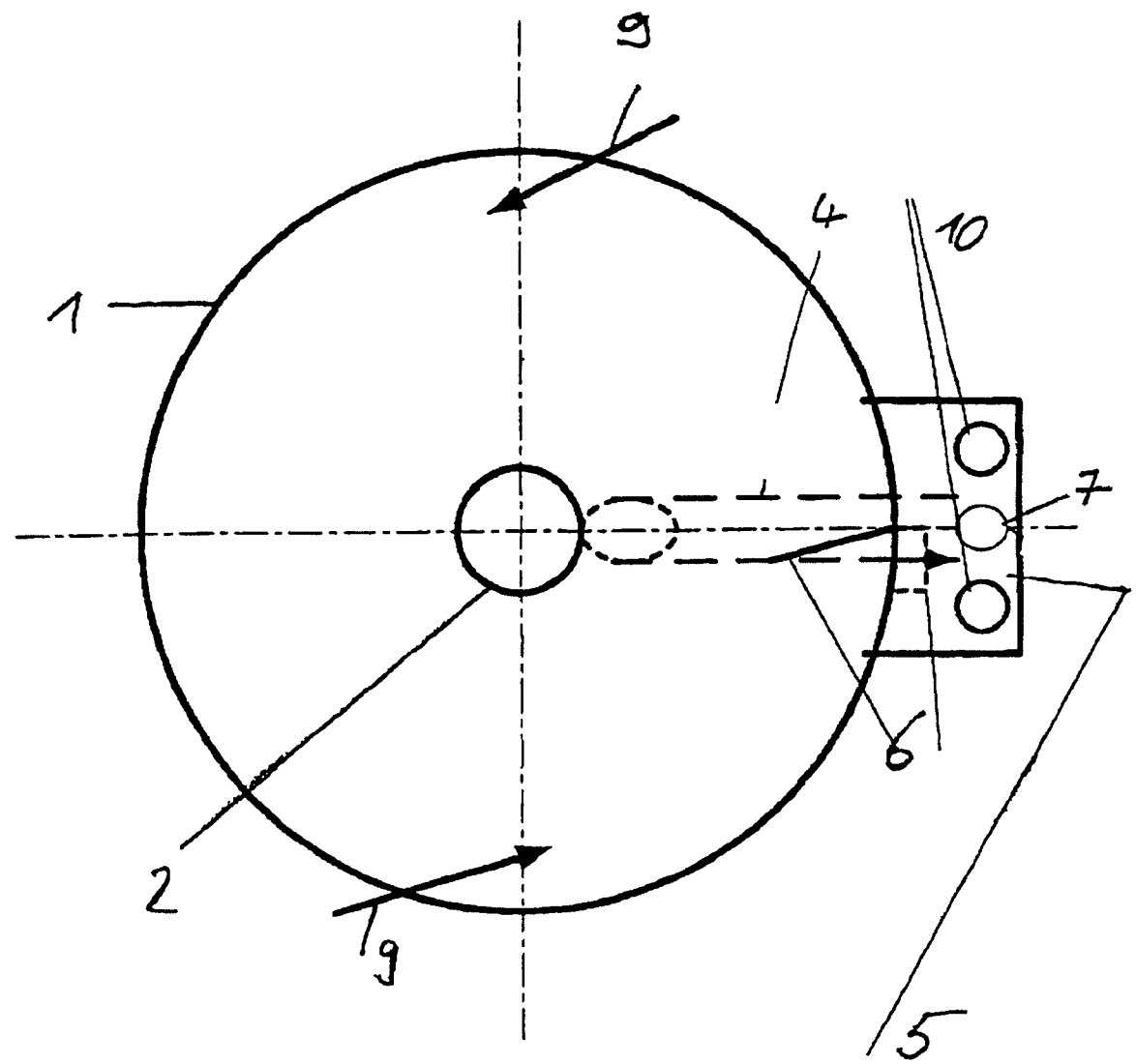
FIG. 2 shows the bioreactor shown in FIG. 1 in a top view.

In the top view of the bioreactor shown in FIG. 2, the same system parts are provided with the same reference numbers as in FIG. 1. In the top view, it can be clearly seen that the discharge pipe 4 is divided into two pipes 10, the two pipes emptying from underneath into the discharge chamber 5. One pipe that can be shut off ends flush with the bottom of the discharge chamber 5 and defines the minimum liquid fill level in the reactor tank 1. The second pipe that cannot be shut off projects into the discharge chamber with a camber to the outlet of the lower pipe that corresponds to the maximum liquid fill level in the reactor tank.

The illustrated bioreactor operates as follows:

In the tilted part of the discharge pipe 4 that runs within the reactor tank 1, biogas bubbles rise vertically, collect on the inner top side of the pipe and coalesce there into larger bubbles whose flotation effect on solid particles is less than that of microbubbles. This causes separation of gas and solids. The latter can settle along the tilted inner surface of the pipe and can be returned against the main flow in the discharge pipe 4 into the reactor tank 1. This is supported by the eddy action of the inlet of the guide pipe 2 in the bottom area, while liquid subsequently flows out of the inner reactor area via the obliquely cut mouth of the discharge pipe 4. The formation of larger flakes with better sedimentation properties in the discharge pipe 4 is supported by coagulating, flake-forming chemicals being metered into the discharge pipe 4. When using, e.g., iron chloride, sulfide precipitation takes place at the same time, which reduces the hydrogen sulfide concentration in the biogas. In the area of the maximum liquid level 12 in the reactor tank 1, there is a nozzle system 9 via which liquid-free jets can be injected into the reactor tank 1. By the forces of momentum of the liquid-free jets, the floating material washed radially to the outside by the liquid swell from the guide pipe on the top end is degassed and mixed again into the liquid. This effect can be supported by metering a foam inhibitor. In this way, unmanageable components of the floating layer can be removed from the reactor tank 1.

To do this, the fill level of the reactor tank 1 is dammed up by closing the lower discharge pipe in the discharge box 5. A rotary flow is induced along the reactor tank wall by the horizontal portion of the momentum of the liquid-free jets, by which the floating material is set into motion. The floating material banks up against the now flooded flow deflector plate 6. After opening a wall slide valve between the reactor tank 1 and the discharge chamber 5, the floating material can finally be withdrawn via the outlet pipe 7.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding German application No. 102004054673.8, filed Nov. 12, 2004 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for biological treatment of a suspension in a bioreactor, at least part of the treated suspension being withdrawn from the bioreactor, characterized in that the treated suspension is removed from a zone of the bioreactor in which there is a solid concentration that is lower than the average solid concentration in the bioreactor, and the removed suspension is routed out of the bioreactor by way of a discharge (4) that is tilted against the horizontal such that in the withdrawn suspension, separation of gas and solids is produced and at least a portion of the solids is returned against the main suspension flow in the discharge (4) to the bioreactor.

2. A process according to claim 1, wherein to circulate the suspension in the central area of the bioreactor, a vertical flow, and in the edge area of the bioreactor, a vertical flow, directed opposite the flow in the central area with a lower flow velocity, are produced, and the treated suspension is removed from the lower edge area of the bioreactor.

3. A process according to claim 2, wherein the flow in the edge area has a flow velocity of less than 2.5 cm/sec.

4. A process according to claim 3, wherein said flow velocity is about 0.5 to 1.5 cm/sec.

5. A process according to claim 4, wherein the solid concentration that is lower than the average solid concentration is lower by at least 40%.

6. A process according to claim 2, wherein the solid concentration that is lower than the average solid concentration is lower by at least 15%.

7. A process according to claim 1, wherein the removed suspension discharged from the bioreactor at a flow velocity of from 0.5 to 2.5 cm/sec via the discharge.

8. A process according to claim 1, wherein the solid concentration that is lower than the average solid concentration is lower by at least 15%.

9. A process according to claim 1, wherein the solid concentration that is lower than the average solid concentration is lower by at least 40%.

10. A device for biological treatment of a suspension with a bioreactor that has a vertically aligned reactor tank (1) for holding the suspension, a vertically aligned guide means (2) being located in the interior of the reactor tank (1) for circulation of the suspension, wherein there is a discharge pipe (4) that is tilted against the vertical, which begins within the reactor tank (1) in the vicinity of the bottom of the reactor tank (1) and which ends outside of the reactor tank (1) in the upper area.

11. A device according to claim 10, wherein the guide means (2) is a guide pipe, the diameter of the guide pipe and the diameter of the reactor tank being in a ratio of from 0.1 to 0.15.

12. A device according to claim 10, wherein the discharge pipe (4) has a diameter of from 300 mm to 1000 mm.

13. A device according to claim 10, wherein the discharge pipe (4) has a tilt angle against the vertical of from 30 degrees to 45 degrees.

14. A device according to one of claim 10, wherein outside the reactor tank (1), the discharge pipe (4) is divided into two pipes, the sum of the cross-sectional areas of these two pipes being at most as great as the cross-sectional area of the discharge pipe (4), and the two pipes empty into a discharge chamber (5) that is located outside on the reactor tank (1).

15. A device according to claim 14, wherein the pipes empty from underneath into the discharge chamber (5), the one pipe having the capacity to be shut off and ending flush with the bottom of the discharge chamber (5) and defining the minimum liquid fill level (11) in the reactor tank (1), while the other pipe with a camber to the outlet of one pipe projects into the discharge chamber (5) and defines the maximum liquid fill level (12) in the reactor tank (1).

16. A device according to claim 14, wherein an outlet pipe (7) leads from the bottom of the discharge chamber (5) for withdrawal of treated suspension.

17. A device according to claims 14, wherein an exhaust gas line (8) is mounted on the cover of the discharge chamber (5).

18. A device according to claims 14, wherein in the area of the discharge chamber (5), there is a sealable passage into the reactor tank wall from the reactor tank interior to the discharge chamber (5).

19. A device according to claim 18, wherein the passage in the reactor tank interior is provided with a flow deflector plate (6) that is set at an angle from roughly 5 degrees to roughly 10 degrees to the radial direction.

20. A device according to claim 18, wherein at the height of the passage, there is at least one nozzle (9) for delivering a liquid-free jet into the reactor tank (1).

* * * * *